United States Patent [19]

Rieke et al.

[11] Patent Number: 4,541,570

[45] Date of Patent: Sep. 17, 1985

[54] ENDGATE FOR MANURE SPREADER

[75] Inventors: David M. Rieke; Larry J. Pingry, both of Celina, Ohio

[73] Assignee: The Paul Revere Corporation, Coldwater, Ohio

[21] Appl. No.: 558,824

[22] Filed: Dec. 7, 1983

[51] Int. Cl.$^4$ ............................. A01C 19/00; A01C 15/16
[52] U.S. Cl. .................................... 239/676; 222/627; 239/679
[58] Field of Search .................... 239/676, 679, 671; 192/48.3; 222/627

[56] References Cited

U.S. PATENT DOCUMENTS

| | | | |
|---|---|---|---|
| 3,170,699 | 2/1965 | Smith et al. | 239/676 |
| 3,253,834 | 5/1966 | Ding et al. | 239/676 |
| 4,219,163 | 8/1980 | Hale et al. | 239/676 |
| 4,350,303 | 9/1982 | van der Lely | 239/676 |

OTHER PUBLICATIONS

New Idea Brochure Titled, "Manure Spreaders Model 244", AVCO Distributing Corporation, Coldwater, Ohio.
Instructions and Repair Parts List Titled, "New Idea No. 12A", AVCO Distributing Corporation, Coldwater, Ohio.

*Primary Examiner*—Andres Kashnikow
*Assistant Examiner*—L. E. Williams
*Attorney, Agent, or Firm*—Abraham Ogman; Robert J. McNair

[57] ABSTRACT

A hydraulically actuated endgate is presented which places a panel directly in front of the beaters of a manure spreader. The endgate retains all of the manure within the spreader box until the spreading site is reached. The panel is hinged mounted along its top edge to a generally U-shaped structural member. The central portion of the U-shaped member spans the box just in front of the beater. The legs of the U-shaped member are of equal length and extend forward along the sides of the spreader. The very ends are pivotally attached to the box, one on the left, the other on the right. A hydraulic piston attached to an arm secured to one of the pivot points makes it possible to move the structural member upward through an arc of about 100 degrees, then back down to the rest position.

5 Claims, 6 Drawing Figures

ENDGATE FOR MANURE SPREADER

BACKGROUND OF THE INVENTION

This invention relates to an agricultural implement and in particular to a movable endgate which prevents spillage through the beater section of a manure spreader during transport to the field.

Most manure spreaders are tractor drawn. In recent machines, power to drive the unloading mechanism is taken from the power-take-off of the tractor. Additionally, the tractor may furnish a supply of hydraulic fluid to actuate certain functions on the spreader.

The U.S. Pat. No. 4,480,735 to Pengrio and assigned to the same assignee as this application, illustrates the functioning of the drive system which is attached to the power-take-off of the tractor. A main drive shaft extends down the side of the spreader box. The front end of the shaft is connected by chain and sprocket means to a short PTO shaft positioned on the tongue of the spreader. This short shaft is coupled to and receives power from the PTO of the tractor. At the rear corner of the spreader box, the drive shaft is coupled to the beater and apron conveyor gear boxes by clutch and sprocket means. The clutch and sprocket sequencing arrangement makes it possible for the spreader operator to (1) begin by driving the beater mechanism while keeping the apron conveyor in neutral, (2) shift to operate the conveyor at a slow speed while continuing to drive the beater, (3) shift to drive the conveyor at a second and faster speed while the beater continues at the regular speed, and (4) shift to a clean-out configuration wherein the beater mechanism is declutched while the apron conveyor continues to move at the same fast speed as pertained in step (3).

Movable endgates for manure spreaders are known in the prior art. In one embodiment an endgate was placed just in front of the beaters. This endgate was positioned in slots on either sidewall of the spreader. A rack and pinion mechanism allows the operator to crank the gate up when he reaches the field where the manure is to be spread. A second prior art embodiment utilizes a swinging endgate fixedly attached to a generally U-shaped structural member. The U-shaped member, in the gate down position, lies generally in a horizontal orientation with the central region spanning the width of the spreader box, just in front of the beaters. The open end of the U-shaped structural member faces forward and the forward most end of each leg is pivotally mounted to the top edge of the box, one end on either side of the spreader. When the endgate is swung upward around the pivot points of the structural member, it traverses an arc and the endgate surface will be generally parallel to the top of the spreader box when the structural member has traversed through an arc of 90 degrees.

Our invention improves on the second prior art embodiment. We utilize a generally U-shaped, box-spanning structural member. The endgate, however, is hinge mounted to the throat section of the U-shaped member. This allows the gate to hang down in a generally vertical orientation when the gate is raised. The mounting arrangement includes a stop which assures that the endgate does not swing backward into the beaters when down.

SUMMARY OF THE INVENTION

This invention pertains to a movable endgate which, in its lowered position, prevents spillage of semisolid manure through the beater section of a spreader during the time a load is being hauled from the barn to the field. The endgate comprises two main members. First, there is a generally U-shaped structural member lying generally horizontal across the top of the spreader box. The central portion of the U-shaped member spans the box just in front of the beater. The legs of the U-shaped member are of equal length and extend forward along the sides of the spreader. The very ends are pivotally attached to the box, one on the left, the other on the right. A hydraulic piston attached to an arm secured to one of the pivot points makes it possible to move the structural member upward through an arc of about 100 degrees, then back down to the rest position.

The second member of the endgate is a generally rectangular panel long enough to span the inside width of the spreader box and in the other dimension is at least as wide as the inside heighth of the box. The panel is attached by hinged joints along its top edge to the central portion of the U-shaped structural member. Rubber flaps secured to the panel edges help to make a leakage stopping seal wherever the panel contacts the spreader box sides and bottom. Stops protruding from the U-shaped structural member allow the bottom edge of the hinge mounted panel to come only to a predetermined distance of the beater when the endgate is lowered.

The hinged attachment of the panel to the structural member allows the panel to hang down vertically below the crossbar central section of the structural member when it is in the fully raised condition. Hanging downward in the raised state, the panel shields the machine operator from being hit by chunks of manure inadvertently flung forward by the beaters during the unloading operation. Additionally, the endgate in its raised state, serves to automatically level the load as it is moved rearwardly by the apron conveyor. The leveling action results in a more nearly even spread pattern being achieved.

Our discovery results in an endgate which has a lower center of gravity, when actuated to the raised condition, than is achieved in the prior art swinging endgate. This reduces stress levels both at the pivot points and at the panel hinge attachment points.

BRIEF DESCRIPTION OF THE DRAWINGS

The accompanying drawings are shown by way of illustrating a preferred embodiment of the invention in which.

DESCRIPTION OF THE PREFERRED EMBODIMENT

Figure 1:
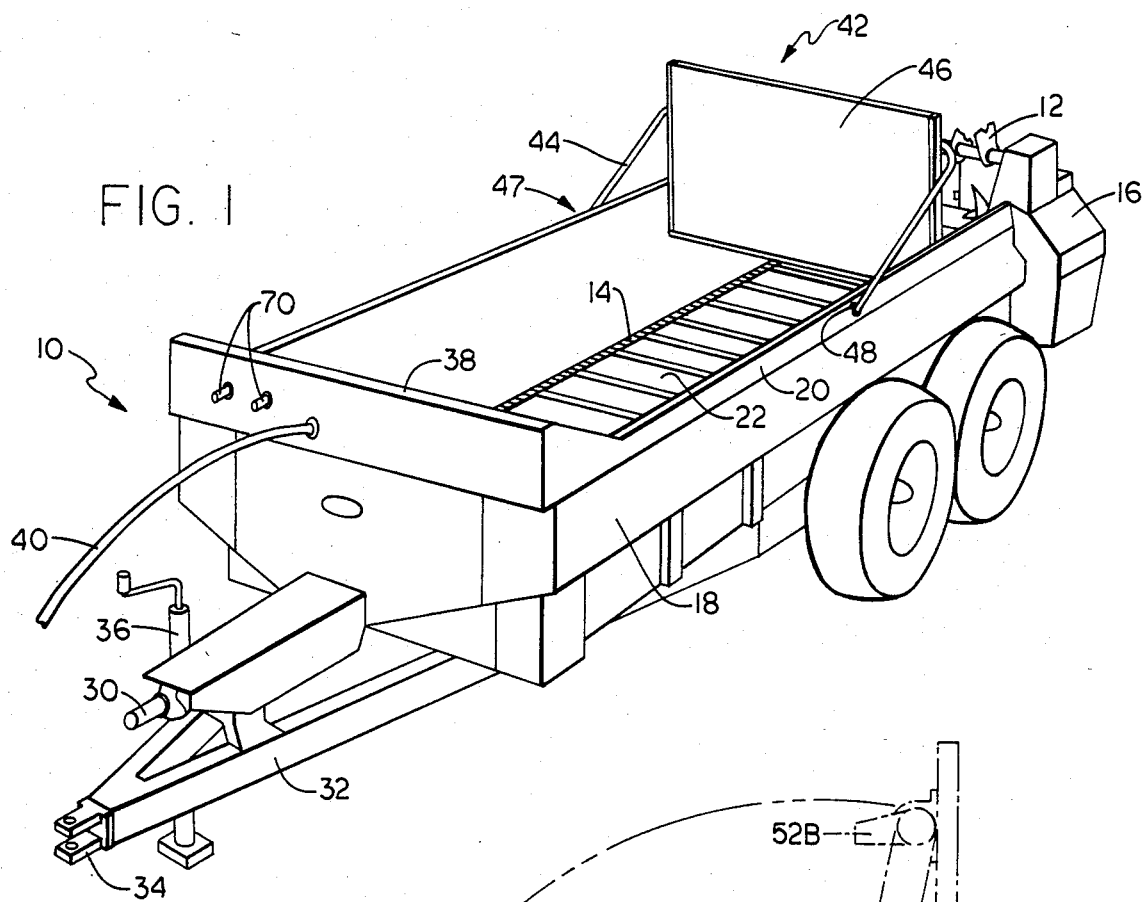
FIG. 1 shows an isometric view of a manure spreader having a movable endgate.

Referring to FIG. 1 there is shown a manure spreader or material unloader 10 having a cargo box 20, transversely mounted beaters 12 at the rear of the box and a conveyor 14 along the bottom 22. The beater and conveyor units are driven by gear mechanisms mounted at the left rear of the machine under protective cover 16. Both the conveyor and beater mechanisms are powered from a drive shaft which extends along the side of the spreader under a protective covering 18. A sprocket and drive chain arrangement at the front of the spreader (not shown) connects the drive shaft to a power shaft having spline coupling 30 at its forward end. Spline coupling 30 provides connection to the power-take-off (PTO) of the tractor. The tongue 32 of the spreader has a hitch 34 on its forwardmost end. A manually operated screw jack 36 keeps the front end of the spreader out of the dirt when unhooked from the tractor.

The front wall 38 of the cargo box has extending therefrom pull rope 40 which is shown extending toward a convenient tie point on the tractor. Pull rope 40 is used to clutch a shifting mechanism which drives the beaters 12 and the conveyor 14 in any of the following combinations: (1) drive the beater mechanism while keeping the apron conveyor in neutral, (2) shift to operate the conveyor at a slow speed while continuing to drive the beater, (3) shift to drive the conveyor at a second and faster speed while the beater continues at the regular speed, and (4) shift to a cleanout configuration wherein the beater mechanism is declutched while the apron conveyor continues to move at the same fast speed as pertained in step (3).

A movable endgate 42 is located just in front of the beaters 12. In the gate down position, endgate 42 closes off the rear end of box 20 preventing loss of cargo through the beater section even if the manure is quite soupy. Endgate 42 is comprised of two main parts, a U-shaped structural member 44 and a box spanning panel 46 (See also FIG. 3). The open ends of the U-shaped structural member 44 face forward with the forwardmost part being pivotally mounted to the top edge of box 20 at pivot points 47 and 48. Panel 46 attaches to structural member 44 by hinge joints 49 and 50 (See FIG. 3).

Figure 2:
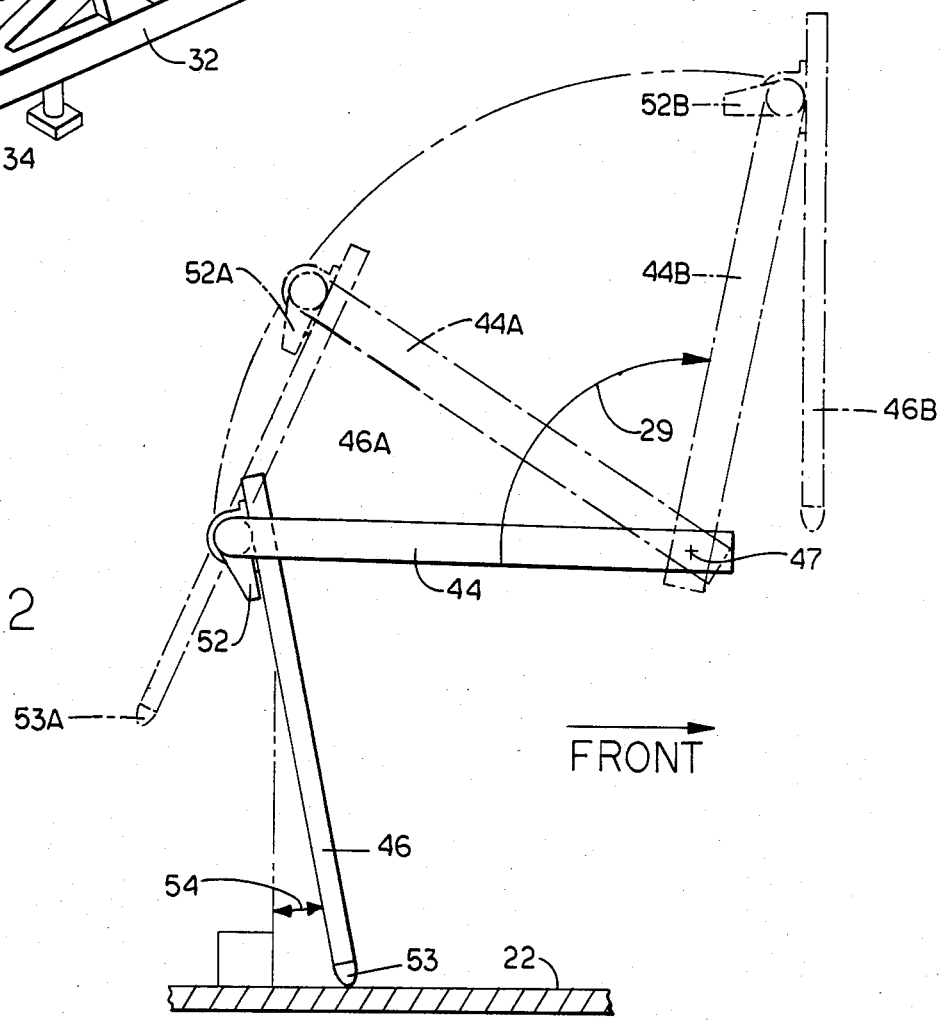
FIG. 2 is a side elevation view showing the endgate in both the closed and raised states.

Attachment of panel 46 to structural member 44 by hinge joints allows relative movement of the two as shown in the side view of FIG. 2.

Structural member 44 (solid lines) is shown in the endgate down position. In this position the lower edge of panel 46 will be in contact with the bottom 22 of the spreader box. To assure good contact with the bottom 22, a flexible member 53 was attached to the lower edge of panel 46 in the unit reduced to practice. A stop 52 was welded to support member 44 so as to keep panel 46 from rotating clockwise, as shown in FIG. 2, beyond that value which would bring angle 54 to less than 10 degrees. Maintaining angle 54 at a small positive value does two things. First, it places a downward force on the panel during the trip to the field when leakage is to be minimized. Second, as the endgate is being raised around pivot point 47 to the configuration shown in the 44A, 46A status, the lower edge of flexible member 53A will be prevented from getting hit by the beater due to the restriction of stop 52A. At the same time, the act of rotating structural member 44 upward readily pulls panel 46 free from the manure piled up on the front side since upward motion of the stop relaxes pressure on the back side of the panel.

In the unit reduced to practice structural member 44 was implemented to be raised through an arc 29 (See FIG. 2) of 100 degrees maximum. This state is shown in the 44B, 46B configuration of FIG. 2. With structural member 44B as shown, panel 46B will normally hang straight down as shown. However, since the panel is attached to the support member by hinged joints 49 and 50 (See FIG. 3) the bottom edge will swing back and forth dependent on the depth of the manure in the spreader box. With the stop 52 B now appearing in the position shown in FIG. 2, panel 46B can swing clockwise until it is parallel with the top of the spreader. Swinging free as it does when the endgate is fully open, the panel 46 serves as a load leveler thus helping to even out the spread pattern from the beaters.

Figure 4:
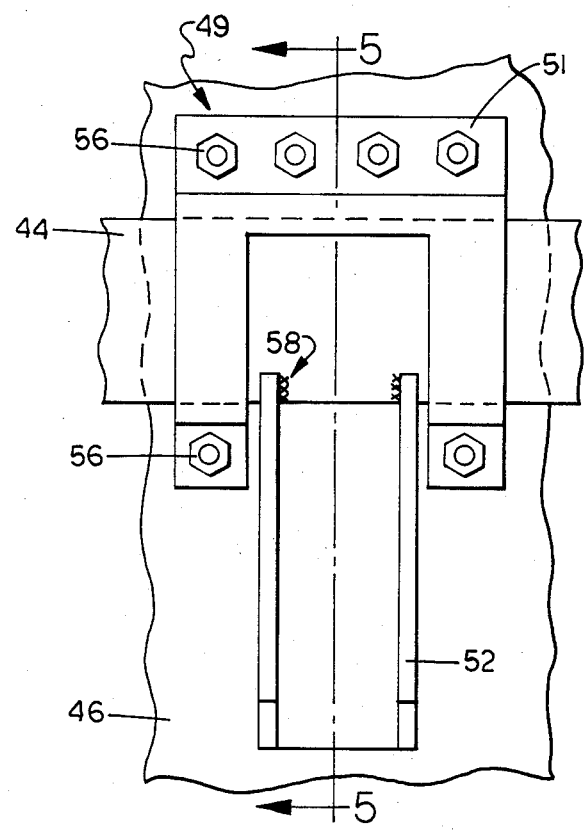
FIG. 4 shows a frontal view of one of the hinge supports by which the panel is attached to the structural member.
Figure 5:
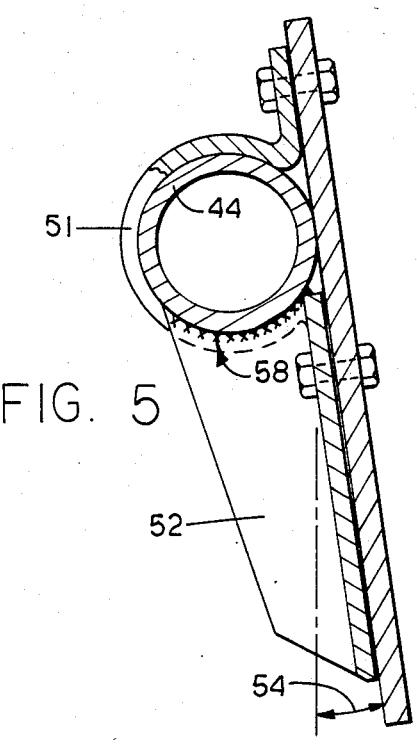
FIG. 5 is a cross sectional view of the hinge support taken along line 5—5 of FIG. 4.

FIGS. 4 and 5 show the details of how the panel 46 is mounted on structural support member 44 by hinge joints 49 and 50. In the unit reduced to practice structural support member 44 was a 3 inch diameter steel tube. This made it possible to configure a hinge mechanism which consisted of an omega shaped bracket 51 which encircled support member 44. Bracket 51 could then be attached to panel 46 by means of a series of bolts 56 arranged as shown in FIG. 4. Cutout section in the lower portion of bracket 51 was used to attach stop 52 to support member 44. Stop 52 was secured to support member 44 by a weldment 58. The attachment point of stop 52 to support member 44 was such that angle 54 equaled 10 degrees in front of the vertical when the endgate was in the down position. Placing stop 52 in a cutout region of bracket 51 prevented any endwise slippage of panel 46 with respect to support member 44. Lubrication of the interface between bracket 51 and support member 44 allowed the gate to swing freely at the hinge points.

Figure 3:
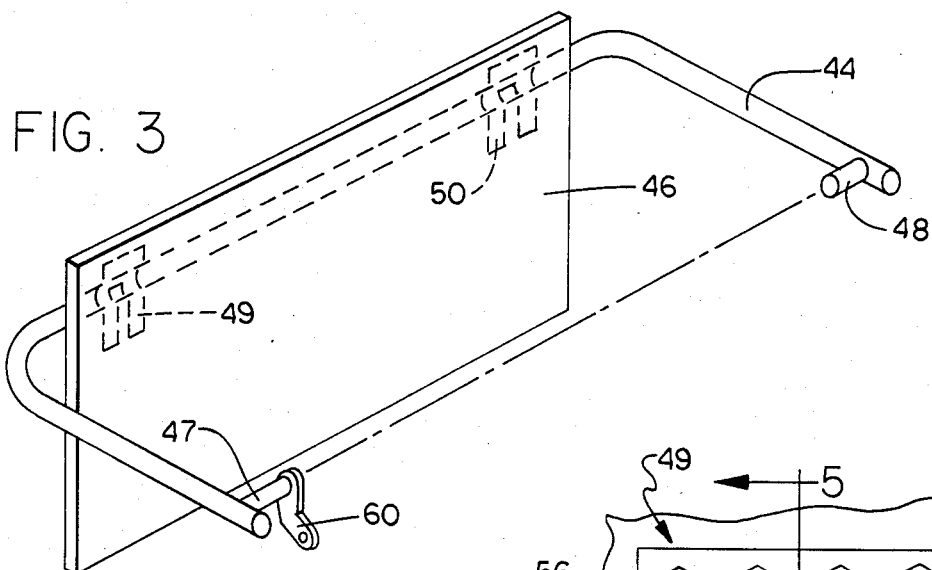
FIG. 3 is an isometric view of the endgate.
Figure 6:
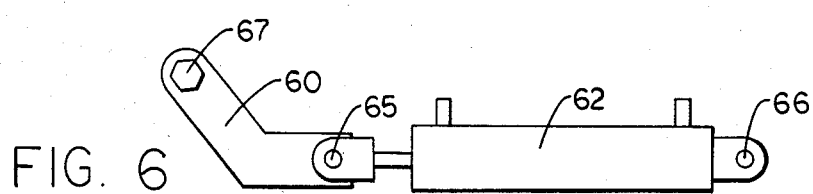
FIG. 6 is a side view of the hydraulic actuated mechanism used to raise the endgate.

FIGS. 3 and 6 show the means for moving the endgate from the closed to the open position. As shown in FIG. 3, an arm 60 is attached to pivot point 47. Arm 60 can be attached in any of several ways. FIG. 6 shows attachment of arm 60 to the pivot point by means of a hexagonal shoulder 67. The second end of arm 60 is attached to hydraulic cylinder 62 by means of pin 65. The fixed end of hydraulic cylinder 62 is attached to the side of spreader box 20 by means of a pin 66. In the machine reduced to practice hydraulic cylinder 62 was positioned under an outward extending flap of the spreader box. This protected it from damage during operation. The hydraulic lines to operate the cylinder extended forward to the front wall 38 of the cargo box where fittings 70 were available for attachment to the hydraulic lines of the tractor. With the hydraulic cylinder in the retracted state shown in FIG. 6 the endgate would be in the closed position. Raising of the endgate would occur on extension of the piston of hydraulic cylinder 62.

In summary, a swinging hydraulically operated endgate has been described which consists of a movable panel placed in the spreader box directly in front of the beaters. The endgate contains manure within the spreader box until the spreading site has been reached. In the system reduced to practice, flexible flaps were attached to three sides of the panel so that they provided a seal against the box sides and bottom thereby helping to eliminate leakage of liquids. The hinge attachment between the panel and structural support member allows the panel to remain vertical when raised. This accomplishes two benefits. First, it shields the operator from material being thrown forward from the beaters. Second, the endgate automatically levels loads of manure which are heaped above the spreader box sides. This leveling action produces a more even spread pattern. In some applications it may be desirable to extend the top edge of the panel upward in a manner similar to that of the front wall 38 of the cargo box. This serves as a splash shield and reduces material spillage when the spreader is being towed up steep grades on the way to the field.

The specification of the elements of the preferred embodiment should not be taken as a limitation on the scope of the appended claims.

We claim:

1. A movable endgate for a manure spreader having an open topped cargo box with sidewalls, a front wall and a bottom, there being transversely mounted beaters at the rear of the box and an apron conveyor along the bottom of the box for moving material rearwardly toward the beaters, said endgate comprising:
    a generally U-shaped, box spanning structural member having its central region positioned just forward of said beaters, the open end of each leg of said structural member facing forward and being attached by pivotal means to the top edge of said box sidewall, one pivotal attachment point being on each exterior sidewall of said cargo box;
    a rectangular panel having a length adequate to span the inside width of the cargo box and a width at least equal to the inside heighth of said box, said panel being attached near its top edge by hinge joint means to the central portion of said structural member;
    means for rotating said structural member about its pivot points from a rest position to an endgate-open position wherein the bottom edge of said rectangular panel is lifted to allow rearward flow of material from said cargo box, said rectangular panel in said endgate-open position hanging from said hinge points under the pull of gravity pivotally swinging about a generally vertical plane thereby providing both cargo leveling and protection from beater thrown material; and
    stop means protruding from said structural member and contacting the hinge mounted panel to prevent it from swinging closer than a predetermined distance from said beaters when said endgate is in the closed or partially open condition.

2. The invention as defined in claim 1 wherein the means for rotating said structural member includes a hydraulic cylinder having its fixed end attached to the sidewall of said cargo box and its movable piston end attached to one end of an arm whose second end is secured to a pivot point of said structural member, said arm functioning as a crank.

3. The invention as defined in claim 2 wherein said hydraulic cylinder moves said structural member through an arc of 100 degrees in going from the endgate down to open positions.

4. The invention as defined in claim 1 wherein said stop means holds the vertical orientation of said panel such that the lower edge thereof is forward of the top edge when said endgate is down, the amount of said forward shift creating an angle of 10 degrees off of vertical.

5. A movable endgate for a manure spreader having an open topped cargo box with sidewalls, a front wall and a bottom, there being transversely mounted beaters at the rear of the box and an apron conveyor along the bottom of the box for moving material rearwardly toward the beaters, said endgate comprising:
    a structural member comprising a pair of spaced legs attached by pivotal means to the top edge of a cargo box sidewall, one pivotal attachment being on each sidewall of said cargo box, the opposite ends of each of said legs being displaced upwardly and backwardly from said pivot point;
    a rectangular panel having a length adequate to span the inside width of the cargo box and a width at least equal to the inside heighth of said box, said panel being attached along its top edge by hinge joint means to the opposite ends of said legs;
    means for rotating said legs about their pivot points from a rest position wherein said legs are generally parallel with the top of said spreader box to an endgate-open position wherein the bottom edge of said rectangular panel is lifted above the top edge of said cargo box, said rectangular panel in said endgate-open position hanging from said hinge points under the pull of gravity pivotally swinging about a generally vertical plane thereby providing both cargo leveling and protection from beater thrown material; and
    stop means protruding from each of said legs and contacting the hinge mounted panel to prevent it from swinging closer than a predetermined distance from said beaters when said endgate is in the closed condition.

* * * * *